(12) United States Patent
Wawzyniak et al.

(10) Patent No.: US 9,884,534 B2
(45) Date of Patent: Feb. 6, 2018

(54) AIR-CONDITIONING SYSTEM, IN PARTICULAR FOR A MOTOR VEHICLE

(71) Applicant: MAHLE Behr GmbH & Co. KG, Stuttgart (DE)

(72) Inventors: Markus Wawzyniak, Ludwigsburg (DE); Elke Dettling, Asperg (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 305 days.

(21) Appl. No.: 14/576,259

(22) Filed: Dec. 19, 2014

(65) Prior Publication Data

US 2015/0174985 A1    Jun. 25, 2015

(30) Foreign Application Priority Data

Dec. 20, 2013   (DE) .......................... 10 2013 227 046

(51) Int. Cl.
*B60H 3/00*    (2006.01)
*B61D 27/00*   (2006.01)
*B60H 1/00*    (2006.01)

(52) U.S. Cl.
CPC ....... *B60H 1/0005* (2013.01); *B60H 1/00007* (2013.01); *B60H 1/00642* (2013.01); *B60H 1/00035* (2013.01); *B60H 2001/00164* (2013.01)

(58) Field of Classification Search
CPC ........ B60H 1/0005; B60H 2001/00164; B60H 1/00064; B60H 1/00007; B60H 1/00678; B60H 1/00035
See application file for complete search history.

(56) References Cited

U.S. PATENT DOCUMENTS 3,262,491 A * 7/1966 Selhost ............... F24F 1/02
                                                     165/48.1
2007/0095517 A1   5/2007 Schall
2013/0098595 A1   4/2013 Schall

FOREIGN PATENT DOCUMENTS

| CN | 103192675 A | 7/2013 |
|---|---|---|
| DE | 199 22 324 C1 | 10/2000 |
| DE | 102 44 954 A1 | 4/2003 |
| DE | 102 42 520 A1 | 3/2004 |
| DE | 10 2004 029 477 A1 | 3/2005 |
| DE | 10 2004 060 434 A1 | 7/2005 |

(Continued)

OTHER PUBLICATIONS

WO 2004033236 A1 translation, Apr. 2004.*
German Search Report, Appl. No. 10 2013 227 046.1, dated Aug. 27, 2014, 7 pgs.

*Primary Examiner* — Len Tran
*Assistant Examiner* — Jon T Schermerhorn
(74) *Attorney, Agent, or Firm* — Paul D. Strain, Esq.; Strain & Strain PLLC (57) ABSTRACT

The invention relates to an air-conditioning system, in particular for a motor vehicle, in which a fan takes in air which flows through an evaporator and/or a heater, wherein the fan has arranged downstream of it an air-bypass channel, which contains a bypass damper and guides air past the evaporator. In the case of an air-conditioning system in which the air-mass flow which flows through the air-bypass channel and/or evaporator can be adjusted in a particularly variable manner, an air-throttle element is arranged in and/or on the air-bypass channel and/or upstream or downstream of the evaporator.

2 Claims, 7 Drawing Sheets

(56) References Cited

FOREIGN PATENT DOCUMENTS

| | | | |
|---|---|---|---|
| DE | 10 2010 029 495 A1 | 12/2011 | |
| DE | 102010029495 A1 * | 12/2011 | ........... B60H 1/0005 |
| EP | 1 861 270 B1 | 7/2010 | |
| EP | 2 450 204 A2 | 5/2012 | |
| WO | WO 2004033236 A1 * | 4/2004 | ......... B60H 1/00021 |

* cited by examiner

AIR-CONDITIONING SYSTEM, IN PARTICULAR FOR A MOTOR VEHICLE

CROSS-REFERENCE TO RELATED PATENT APPLICATIONS

This application is based upon and claims the benefit of priority from prior German Patent Application No. 10 2013 227 046.1, filed Dec. 20, 2013, the entire contents of which are incorporated herein by reference in their entirety.

TECHNICAL FIELD

The invention relates to an air-conditioning system, in particular for a motor vehicle, according to the preamble of Claim 1.

PRIOR ART

EP 2 450 204 A2 discloses an air-conditioning system which is intended for a motor vehicle and comprises a fan which takes in air which flows through an evaporator and/or a heater, wherein the fan has arranged downstream of it an air bypass, which guides air past the evaporator.

DE 10 2010 029 495 A1 discloses a temperature-control device, and a method of generating a temperature-controlled air stream, in which the air stream guided past the evaporator is guided, in a bypass channel, past a filter and the evaporator. The bypass channel has arranged in it a regulating mechanism, which controls the quantity of air flowing via the bypass.

DE 10 2004 060 434 A1 discloses a multi-zone motor-vehicle air-conditioning system in which individual zones of the motor-vehicle air-conditioning system are subdivided by partition walls. The partition walls used here are in the form of louvered-screen flaps or rolling-strip cassettes.

The bypass channel, which guides some of the air past the evaporator, ensures that the air-conditioning system can be operated in a relatively energy-efficient manner. However, depending on the required quantity of air flowing through the bypass channel, it may be difficult to adjust precisely the division of the air stream between the evaporator and bypass channel merely by the opening of the bypass channel with the aid of the bypass damper.

DESCRIPTION OF THE INVENTION, OBJECT, SOLUTION AND ADVANTAGES

It is an object of the invention to create an air-conditioning system in which the air guided past the evaporator by way of the bypass channel can be adjusted in quantity as required.

This is achieved by the features of Claim 1.

An exemplary embodiment relates to an air-conditioning system, in particular for a motor vehicle, in which a fan takes in air which flows through an evaporator and/or a heater, wherein the fan has arranged downstream of it an air-bypass channel, which contains a bypass damper and guides air past the evaporator. In the case of this air-conditioning system, an air-throttle element is arranged in and/or on the air-bypass channel and/or upstream or downstream of the evaporator. Such an air-throttle element allows differentiated adjustment of the air flowing through the air-bypass channel. This makes it easier to regulate the fractions of air-mass flow through the evaporator and/or the air-bypass channel.

The air-throttle element is advantageously designed in the form of a rolling-strip cassette, which is arranged more or less transversely to the air-bypass channel. A rolling-strip cassette, furthermore, is understood as being a subassembly which comprises a driveshaft and a deflecting shaft, on which is guided an endless strip which closes, or partially or fully opens, through-passage openings for air. Such a rolling-strip cassette is therefore a particularly preferred means for forming a throttle element for adjusting in differentiated fashion the quantity of air flowing through the air-bypass channel and/or through the evaporator.

In one configuration, the rolling-strip cassette is positioned upstream or downstream of the evaporator, more or less perpendicularly to the flow direction of the air which has been taken in, wherein air-passage openings of the rolling-strip cassette are open in the region of the evaporator in any state of the rolling-strip cassette. This ensures that air constantly enters into the evaporator, irrespective of whether the rolling-strip cassette stops, or allows through, the quantity of air in the region of the air-bypass channel.

In a particularly straightforward design, the rolling-strip cassette is arranged between the evaporator and a filter, which is arranged downstream of the fan. The entire air stream coming from the fan can advantageously by divided up here between the air-bypass channel and evaporator.

In an alternative, the air-throttle element is designed in the form of a louvered screen and is arranged upstream of the evaporator more or less perpendicularly to the flow direction of the air which has been taken in. Since the position of the louvered screen can be adjusted in a variable manner, the quantity of the air-mass flow which passes through the evaporator is sensitively regulated.

In a further alternative, the bypass damper is designed in the form of a diverter. The bypass damper here knows only two operating states, that is to say the opening and the closure of the air-bypass channel. In order for the quantity of air which flows through the air-bypass channel to be regulated straightforwardly, the diverter is arranged at an entrance of the air-bypass channel, which more or less terminates with a periphery of the evaporator, wherein the diverter is mounted such that it can be pivoted on one side at a point of rotation, directed toward the evaporator, and it opens or closes the air-bypass channel, depending on the pivoting state.

In order for it to be possible for the quantity of air which flows through the evaporator and/or air-bypass channel to be adjusted in even more differentiated fashion, in addition to the air-throttle elements which have already been explained, a butterfly damper is arranged in a flow path toward the evaporator.

In a development, the air-throttle element can be operated separately or in a state in which it is coupled to the bypass damper. These different forms of activation make is possible, depending on the requirements of the vehicle occupant, for the quantity of air to be appropriately temperature-controlled and for the air-conditioning system to be operated nevertheless in an energy-efficient manner.

Further advantageous configurations are described by the following description of the figures and by the dependent claims.

BRIEF DESCRIPTION OF THE DRAWINGS

The invention will be explained in more detail hereinbelow on the basis of at least one exemplary embodiment and with reference to the drawings, in which.

PREFERRED EMBODIMENT OF THE INVENTION

Figure 1:
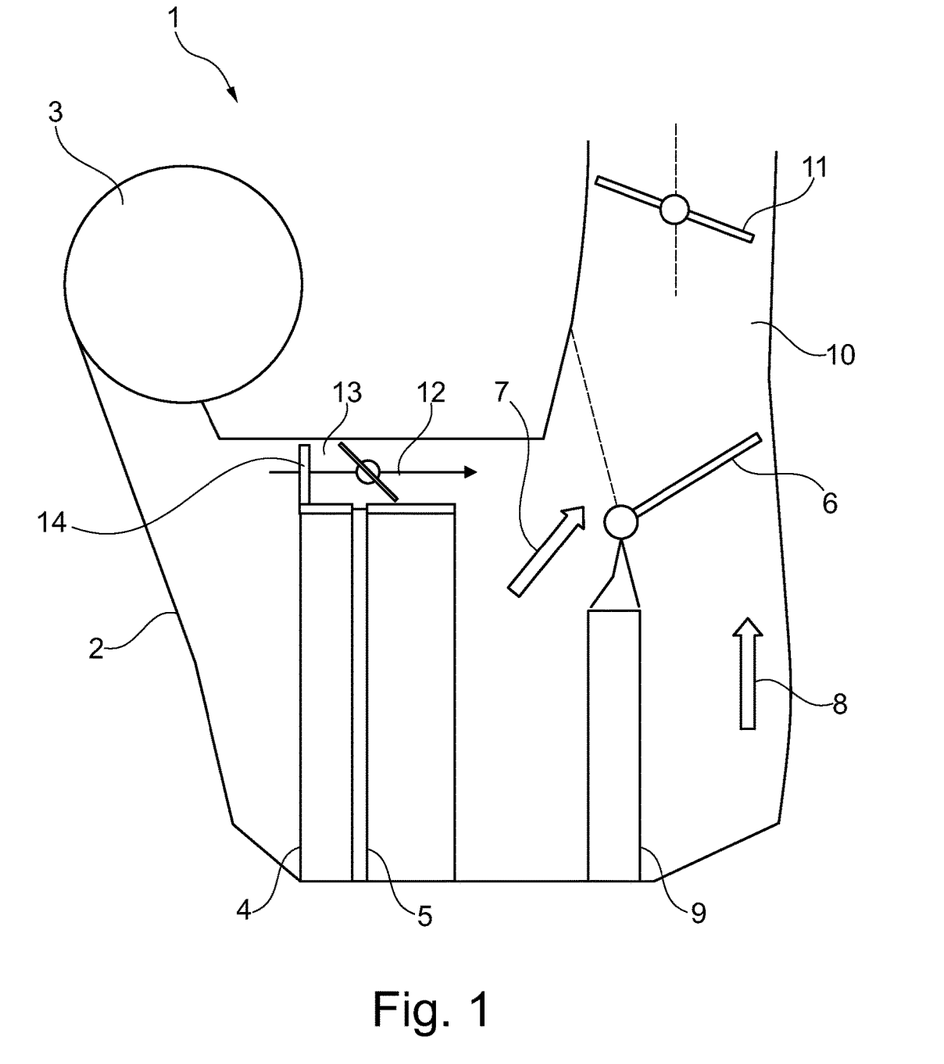
FIG. 1 shows a first exemplary embodiment of an air-conditioning system according to the invention.

FIG. 1 shows an air-conditioning unit 1 as is used in a motor vehicle. This air-conditioning unit 1 has a housing 2 in which is arranged a fan 3, which takes an air stream into the housing 2. A first fraction of the air stream is guided through a filter 4 and an evaporator 5. The first air stream then branches and, in dependence on a position of a mixing damper 6, follows either a cold route 7 or a hot route 8, leading via a heating element 9, to a mixing space 10. In the mixing space 10 a shut-off damper 11 is shut off in relation to one or more exits of the housing 2. The exit is freed or blocked via the shut-off damper 11. From this exit, a temperature-controlled air stream can flow out into the vehicle interior.

A second fraction of the air stream is guided, via an air-bypass channel 12, past the filter 4 and the evaporator 5, and therefore the second fraction of the air stream bypasses both the filter 4 and the evaporator 5. The second fraction of the air stream is fed to the cold route 7. In the cold route 7, the second fraction of the air stream can mix with a fraction of the first air stream which exits from the evaporator 5 and does not flow through the heating element 9. Also arranged in the air-bypass channel 12 is a bypass damper 13. This bypass damper 13 controls the quantity of air flowing via the air-bypass channel 12.

In order for it to be possible for the air-mass quantity which flows through the air-bypass channel 12 and/or the evaporator 5 to be adjusted in an even more variable manner, an air-throttle element 14 is arranged on the air-bypass channel 12 and/or on the evaporator 5. Various configurations of air-throttle elements 14 are conceivable, and these will be explained hereinbelow.

Figure 2:
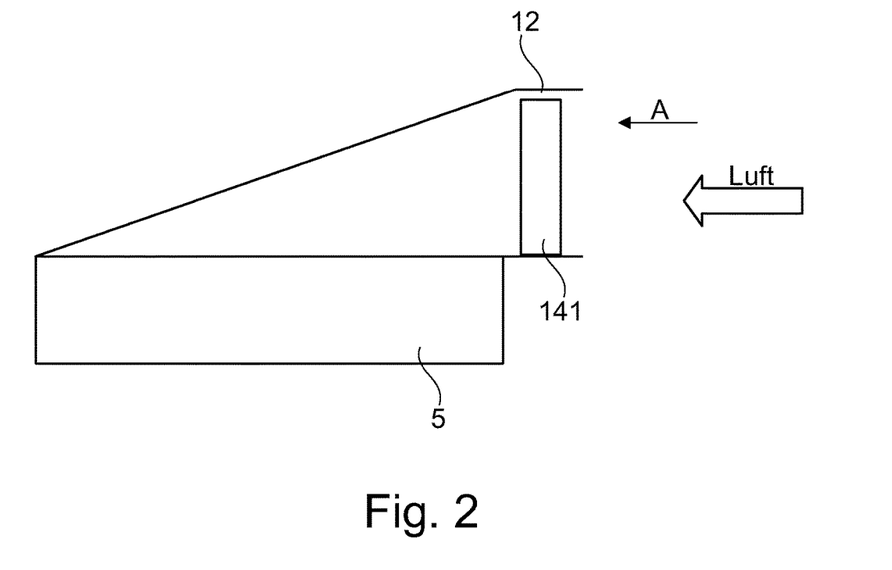
FIG. 2 shows a first exemplary embodiment of an air-throttle element of the air-conditioning system according to FIG. 1.

FIG. 2 shows a further exemplary embodiment, in which the air-throttle element 14 is designed in the form of a rolling-strip cassette 141. This rolling-strip cassette 141 is formed upstream or downstream of the evaporator 5 and the air-bypass channel 12 perpendicularly to the flow direction of the air.

Figure 3:
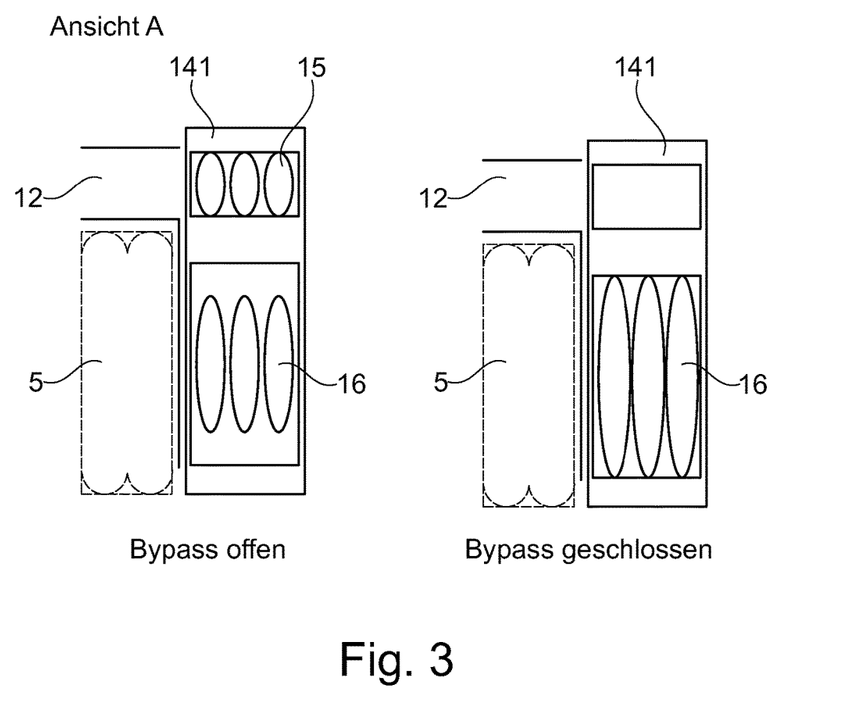
FIG. 3 shows a side view of the air-throttle element according to FIG. 2.

FIG. 3 shows a view A, in which the rolling-strip cassette 141 is illustrated in the open state and in the closed state. As can be gathered from FIG. 3, the rolling-strip cassette 141 covers over not just the air-bypass channel 12, but also, in a direction perpendicular to the flow direction of the air, the evaporator 5. Air-passage openings 15, which supply the air-bypass channel 12 with air, are open here. The air-passage openings 16, which allow through-passage of air into the evaporator 5, are likewise open. If the rolling-strip cassette 141 is in the closed state in the region of the air-bypass channel 12, it is nevertheless the case that the air-passage openings 16, which are arranged opposite the evaporator 5, are open. It is advantageously possible for the air-passage openings 16 in this embodiment to be enlarged, in order to allow a greater quantity of air to flow through the evaporator 5.

Figure 4:
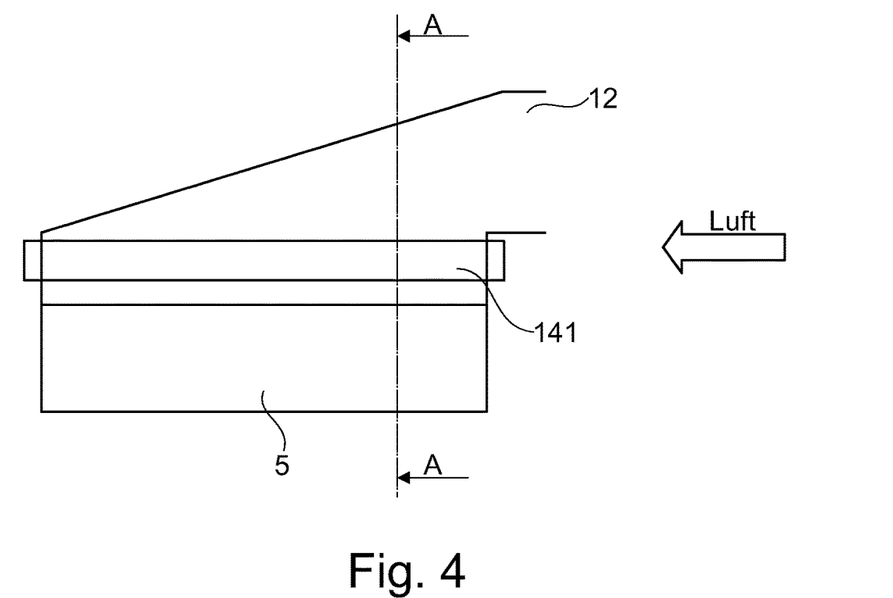
FIG. 4 shows a further exemplary embodiment of an air-throttle element in the air-conditioning system according to FIG. 1.
Figure 5:
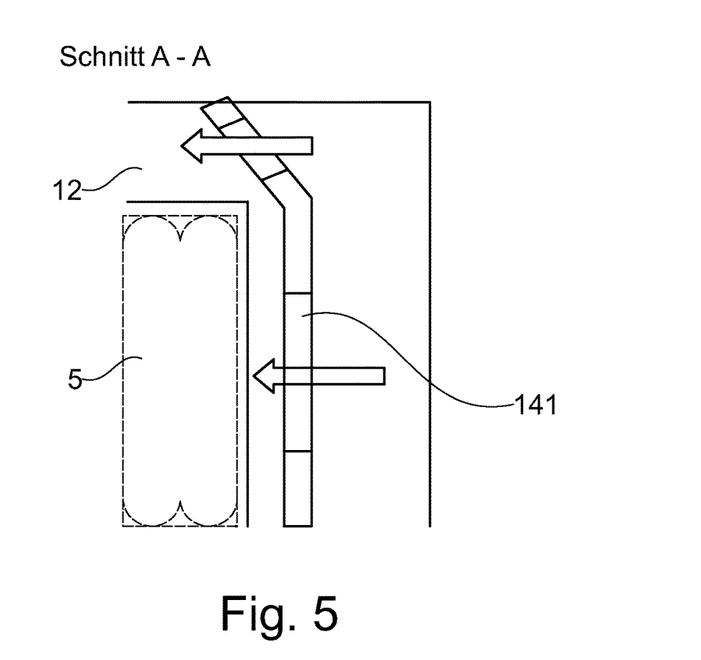
FIG. 5 shows a side view of the air-throttle element according to FIG. 4.

FIG. 4 illustrates the arrangement of the rolling-strip cassette 141 in the region of a flow path toward the evaporator. As can be gathered from section A-A in FIG. 5, the rolling-strip cassette 141 here, in a first region, is oriented parallel to the evaporator 5 whereas a second region projects obliquely into the air-bypass channel 12. It is also the case in this embodiment that the air-passage openings 16 of the first region of the rolling-strip cassette 141, said openings being located upstream of the evaporator 5, are always open, whereas the air-passage openings 15 in the second region of the rolling-strip cassette 141 are closed or open.

Figure 6:
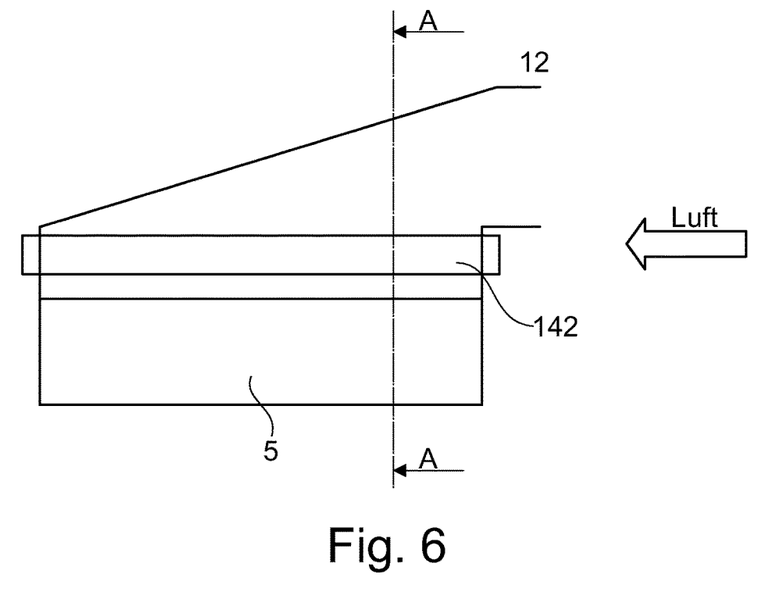
FIG. 6 shows a further exemplary embodiment of an air-throttle element according to FIG. 1.
Figure 7:
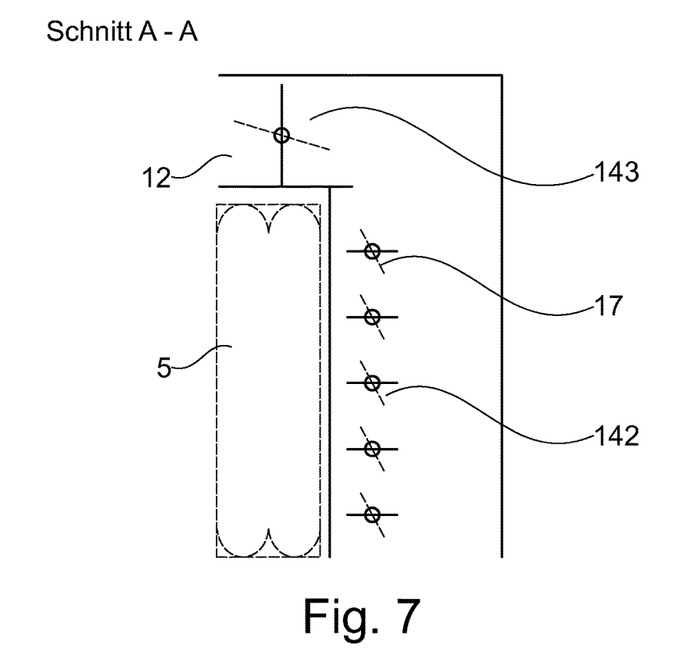
FIG. 7 shows a side view of the air-throttle element according to FIG. 6.

A further embodiment of the air-throttle element, this time in the form of a louvered screen 142, is shown in FIG. 6. The louvered screen 142 is designed to be located directly parallel to, and upstream of, the evaporator 5, the louvered screen projecting into the air-bypass channel 12. The individual slats 17 of the louvered screens 142 can alter their position as desired and thus influence the quantity of air passing through the louvered screen 142. It may be advantageous for a separate louvered screen 143 to be arranged upstream of the air-bypass channel 12, for which region air streams which flow through the evaporator 5, via the louvered screen 142, and through the air-bypass channel 12 can be adjusted independently of one another. An arrangement with a separate louvered screen 143 upstream of the air-bypass channel 12 is illustrated for example in FIG. 7.

Figure 8:
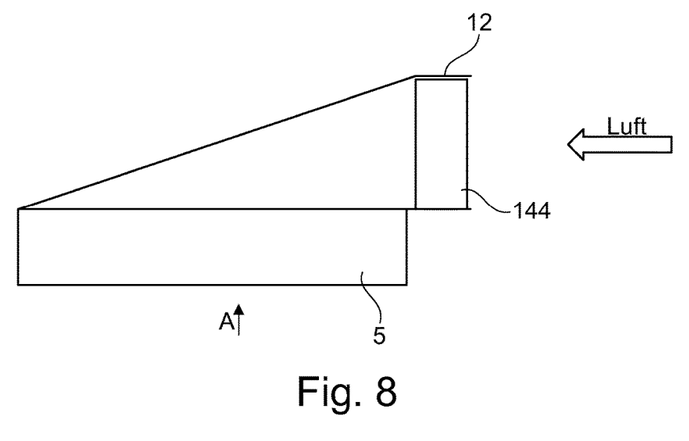
FIG. 8 shows a further exemplary embodiment of the air-throttle element of the air-conditioning system according to FIG. 1.
Figure 9:
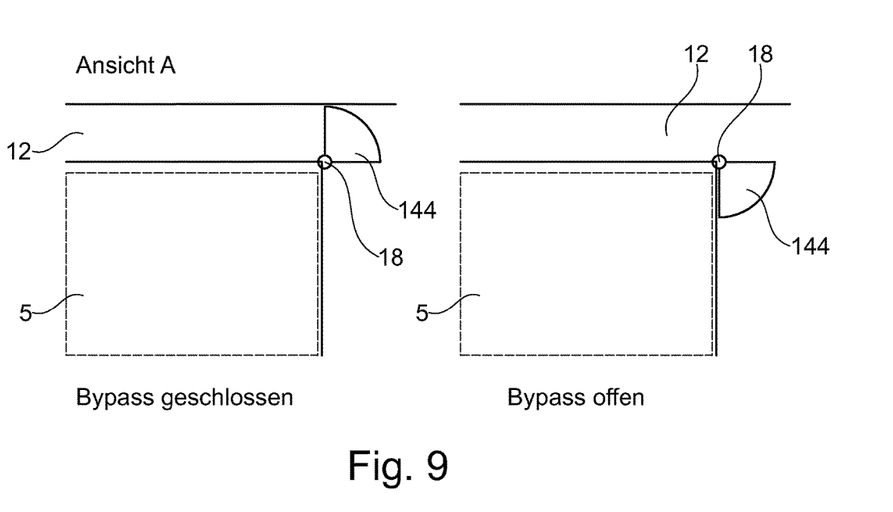
FIG. 9 shows a side view of the air-throttle element according to FIG. 8.

FIG. 8 illustrates a further exemplary embodiment of the air-throttle element, wherein the air-throttle element 14 comprises the bypass damper designed in the form of a diverter 144. The damper of the diverter 144 is in the form of a quarter-circle and is mounted such that it can be pivoted on one side at a point of rotation 18. The point of rotation 18 is arranged on the air-bypass channel 12 in the direction toward the evaporator 5, wherein the point of rotation 18 terminates more or less with a periphery of the evaporator 5. As can be seen in FIG. 9, the air-bypass channel 12 can be either closed to the full extent or opened to the full extent by this diverter 144.

Figure 10:
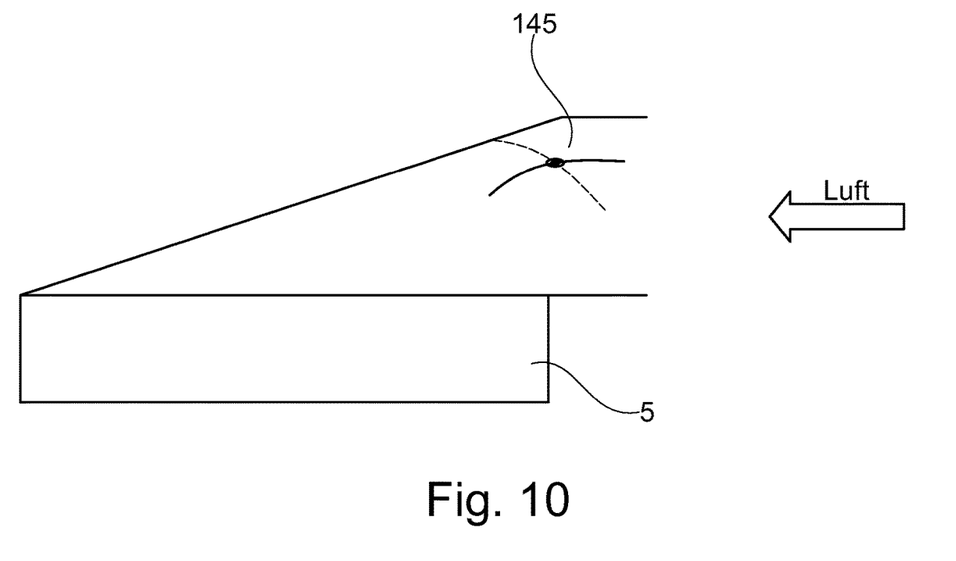
FIG. 10 shows a further exemplary embodiment of an air-throttle element of the air-conditioning system according to FIG. 1.
Figure 11:
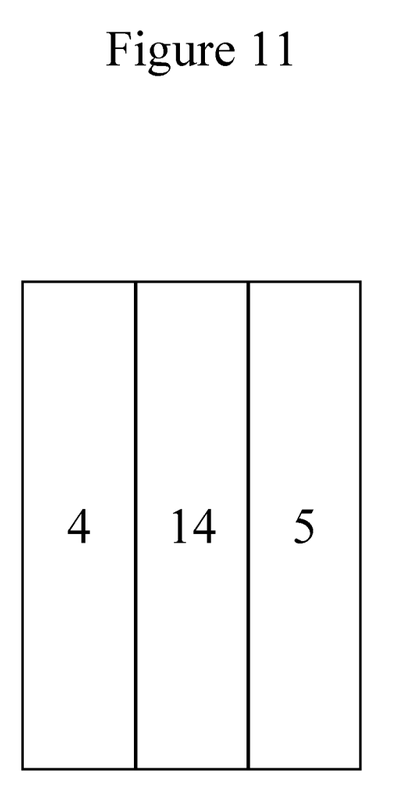
FIG. 11 shows a block diagram representing a further embodiment of the air conditioning system according to the application. The block diagram of FIG. 11 shows connection only and is not intended to show structural features such as relative size, orientation, and spacing.

In addition to the air-throttle elements 14 mentioned, it is possible to use a butterfly damper 145 in the flow path toward the evaporator. This butterfly damper 145 here regulates just a fraction of the air stream flowing through the air-bypass channel 12 and the evaporator 5, since it does not close the air-bypass channel 12 to the full extent. Such a butterfly damper 145 is preferably proposed as an additional air-throttle element if particularly fine metering of air is to take place. A corresponding embodiment with a butterfly damper 145 is illustrated for example in FIG. 10.

The invention claimed is:

1. An air-conditioning system comprising: a housing, a fan arranged on the housing to induce a first air stream and a second air stream inside the housing, a filter arranged within the housing and downstream of the fan, an evaporator arranged downstream of the filter and within the housing, a heating element arranged downstream of the evaporator and within the housing, and an air bypass channel, wherein the first air stream flows through the filter and the evaporator, wherein the second air stream flows through the air bypass channel and bypasses the filter and the evaporator, wherein the air bypass channel comprises a bypass damper and an air-throttle element, wherein the air-throttle element is a rolling-strip cassette arranged transversely to the air-bypass channel, wherein a first portion of the rolling-strip cassette is arranged between the evaporator and the filter and oriented parallel to the evaporator, and a second portion of the rolling-strip cassette projects obliquely into the air bypass channel, wherein the rolling-strip cassette is positioned upstream of the evaporator and perpendicularly to the flow direction of the first air stream, wherein the first portion of the rolling-strip cassette comprises air passage openings for the passage of the first air stream, wherein the air passage openings of the first portion are open in any state of the rolling-strip cassette.

2. The air-conditioning system according to claim 1, wherein the rolling-strip cassette can be activated separately or in a state in which it is coupled to the bypass damper.

\* \* \* \* \*